(12) United States Patent
Clark et al.

(10) Patent No.: US 11,019,442 B2
(45) Date of Patent: May 25, 2021

(54) MUTING MICROPHONES OF PHYSICALLY COLOCATED DEVICES

(71) Applicant: Hewlett-Packard Development Company, L.P., Houston, TX (US)

(72) Inventors: Alexander Wayne Clark, Houston, TX (US); Mary G Baker, Palo Alto, CA (US); Kent E Biggs, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 196 days.

(21) Appl. No.: 16/097,129

(22) PCT Filed: Jul. 8, 2016

(86) PCT No.: PCT/US2016/041468
§ 371 (c)(1),
(2) Date: Oct. 26, 2018

(87) PCT Pub. No.: WO2018/009209
PCT Pub. Date: Jan. 11, 2018

(65) Prior Publication Data
US 2020/0329323 A1    Oct. 15, 2020

(51) Int. Cl.
*H04R 29/00* (2006.01)
*H04M 3/56* (2006.01)
(Continued)

(52) U.S. Cl.
CPC .......... *H04R 29/004* (2013.01); *H04M 3/568* (2013.01); *H04R 1/08* (2013.01); *H04R 3/00* (2013.01); *H04M 2203/50* (2013.01)

(58) Field of Classification Search
CPC .......... H04R 29/004; H04R 1/08; H04R 3/00; H04M 3/568; H04M 2203/50
(Continued)

(56) References Cited

U.S. PATENT DOCUMENTS

| 4,078,155 A | 3/1978 | Botros et al. |
| 4,348,549 A | 9/1982 | Berlant |

(Continued)

FOREIGN PATENT DOCUMENTS

| CN | 102474424 | 5/2012 |
| CN | 103733602 | 4/2014 |

(Continued)

OTHER PUBLICATIONS

WebEx Meeting Center User Guide. Apr. 23, 2010, < http://www.pdc.edu/wp-content/uploads/2012/01/wx_meeting_center.pdf >.

*Primary Examiner* — Vivian C Chin
*Assistant Examiner* — Douglas J Suthers
(74) *Attorney, Agent, or Firm* — HP Inc. Patent Department

(57) ABSTRACT

Examples disclosed herein provide the ability for a computing device to configure one microphone at a time from physically colocated devices to remain active for participating in a teleconference. In one example method, the computing device determines whether a first device with a first microphone on the teleconference is physically colocated with respect to a second device with a second microphone on the teleconference. When the first and second devices are physically colocated with respect to each other, the computing device configures either the first or second microphone to remain active for participating in the teleconference while the other of the first or second microphone is to be muted.

15 Claims, 3 Drawing Sheets

(51) Int. Cl.
*H04R 1/08* (2006.01)
*H04R 3/00* (2006.01)

(58) Field of Classification Search
USPC .......................................................... 381/93
See application file for complete search history.

(56) References Cited

U.S. PATENT DOCUMENTS

| | | |
|---|---|---|
| 4,837,829 A | 6/1989 | Lobb |
| 6,952,471 B1 | 10/2005 | Cannon et al. |
| 7,978,838 B2 | 7/2011 | Rodman et al. |
| 8,000,466 B2 | 8/2011 | Caspi et al. |
| 8,681,203 B1 | 3/2014 | Yin et al. |
| 2006/0234613 A1 | 10/2006 | Hans |
| 2007/0050451 A1* | 3/2007 | Caspi .................. H04M 3/56 709/204 |
| 2009/0316870 A1* | 12/2009 | Wise .................. H04M 3/56 379/202.01 |
| 2012/0127263 A1 | 5/2012 | Ogle et al. |
| 2013/0044871 A1 | 2/2013 | O'Donovan |
| 2014/0329511 A1* | 11/2014 | Vesa .................. H04M 3/568 455/416 |
| 2015/0117626 A1 | 4/2015 | Nord |
| 2015/0296351 A1 | 10/2015 | Tham et al. |

FOREIGN PATENT DOCUMENTS

| | | |
|---|---|---|
| JP | 2011193392 | 9/2011 |
| WO | WO2011089403 A2 | 12/2011 |

\* cited by examiner

MUTING MICROPHONES OF PHYSICALLY COLOCATED DEVICES

BACKGROUND

Collaborative communication between different parties is an important part of today's world. People meet with each other on a daily basis by necessity and by choice, formally and informally, in person and remotely. There are different kinds of meetings that can have very different characteristics. In any meeting, an effective communication between the different parties is one of the main keys for success.

DETAILED DESCRIPTION

Figure 1:
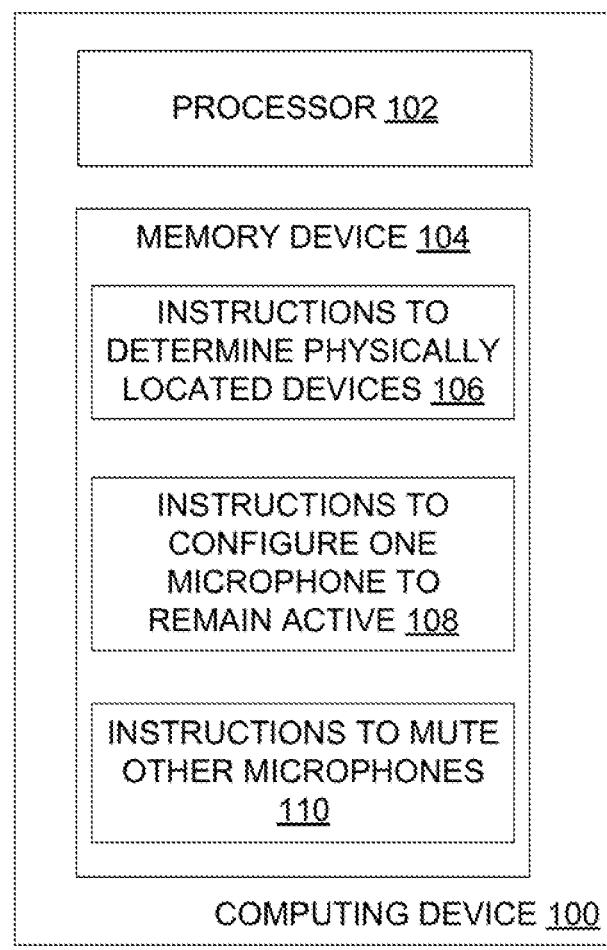
FIG. 1 illustrates a computing device for configuring one microphone at a time from physically colocated devices to remain active for participating in a teleconference, according to an example.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. It should also be noted that a plurality of hardware and software based devices, as well as a plurality of different structural components may be used to implement the disclosed methods and systems.

As used herein, the terms "device" may be used interchangeably and refer to any one of various smartphones, cellular telephones, tablets, laptop computers, personal data assistants (PDA's), VoIP phones, wireless enabled televisions, wireless enabled entertainment systems, and other similar electronic devices that include a processor and are capable of sending and receiving wireless or wired communication signals. Examples of other devices include, but are not limited to, a wearable device, an in-room installed speakerphone, an attachable large form factor speakerphone, a handheld speakerphone, and a Bluetooth earpiece.

Communication technologies, both wireless and wired, have seen dramatic improvements over the past years. A large number of the people who participate in meetings today carry at least one mobile device, where the device is equipped with a diverse set of communication or radio interfaces. Through these interfaces, the mobile device can establish communications with the devices of other users, a central processing system, reach the Internet, or access various data services through wireless or wired networks.

With regards to teleconferences, where some users may be gathered in a conference room for the teleconference, and other users may be logged into the teleconference from remote locations, each user, whether local or remote, may be logged into the teleconference from their respective devices. As multiple users that share a physical location such as the conference room, are signed into the same meeting from their respective devices, there is the possibility of feedback and reverberation, for example, from multiple microphones being live and transmitting on various devices being in proximity to each other. As a result, the audio of the teleconference may be distorted and/or obscured.

Examples disclosed herein provide the ability to determine whether devices are physically colocated, for example, in a conference room, and intelligently mute all but one microphone among the physically colocated devices. As a result, feedback and reverberation can be reduced on a teleconference, in a way that solves any issues automatically, rather than forcing users to manually address any feedback (e.g., by users muting devices one by one until feedback is reduced). Time and productivity may be gained by users on the teleconference because they are not expending efforts by trying to manage live and active devices on the teleconference that may create the feedback.

With reference to the figures, FIG. 1 illustrates a computing device 100 for configuring one microphone at a time from physically colocated devices to remain active for participating in a teleconference, according to an example. As an example, the computing device 100 may be disposed in a conference room, to control devices participating in the teleconference that are physically colocated in the conference room. The computing device 100 depicts a processor 102 and a memory device 104 and, as an example of the computing device 100 performing its operations, the memory device 104 may include instructions 106-110 that are executable by the processor 102. Thus, memory device 104 can be said to store program instructions that, when executed by processor 102, implement the components of the computing device 100. The executable program instructions stored in the memory device 104 include instructions to determine whether there are physically colocated devices on a teleconference 106, instructions to configure one microphone at a time from the physically colocated devices to remain active 108, and instructions to mute other microphones from the physically colocated devices 110.

Instructions to determine whether there are physically colocated devices on a teleconference 106 represent program instructions that when executed by the processor 102 cause the computing device 100 to determine whether there are multiple devices on the teleconference that are in physical proximity to each other to potentially cause feedback, such as the devices in the conference room. When multiple devices on the teleconference are in physical proximity or share the same physical location, there is the possibility of feedback and reverberation, for example, from microphones of the multiple devices being live and transmitting on the various devices while in close proximity to each other. As a result, the audio of the teleconference may be distorted and/or obscured.

As an example, the multiple devices on the teleconference may share the same physical colocation if audio sensed by each device are the same or similar. Meetings almost always involve people talking. Therefore, audio sensing offers a useful way to determine the group of members in the meeting (or teleconference), where each member brings his or her device to the meeting. Generally, almost all devices include microphones, and hearing the same conversation provides a human-centric notion of being physically colocated or attending the same gathering. Specifically, the description proposes using a particular kind of audio sensing and comparing patterns of relative audio silence (i.e., silence signatures) of audio signals from devices used by users on the teleconference.

As an example, each device on the teleconference uses the collection of ambient noise in the environment around the device to create a silence signature. This silence signature is a collection of non-sensitive audio data signifying the highs and lows of the ambient audio. The computing device 100 may then collect the audio sensed by each device on the teleconference at a particular time interval. Devices on the teleconference with very similar sound signatures are either in the same physical location at the same time, or participating in the teleconference remotely, because they are hearing the same ambient noises. Therefore, all devices hearing the same sound signature can be determined to be within the same room or conference call and marked for vulnerability to feedback.

As an example, the determination of whether multiple devices on the teleconference share the same physical colocation may be based on positioning or geolocation. If the multiple devices share a geolocation, it is likely that the devices share the same physical colocation (e.g., the multiple devices in the conference room), and there is the possibility of feedback and reverberation. The technology for determining the geolocation of the devices may vary. Examples include, but are not limited to, utilizing GPS or utilizing the knowledge of Wi-Fi terminal locations surrounding the devices on the teleconference. As an example, determining the location of the devices on the teleconference may use any of the techniques described above by itself or in combination.

Upon determining there are devices on the teleconference that are colocated with each other, instructions to configure one microphone at a time from the physically colocated devices to remain active 108 represent program instructions that when executed by the processor 102 cause the computing device 100 to ensure that any feedback between the physically colocated devices are reduced or eliminated. By configuring only one microphone from the physically colocated devices to remain active, any communication originating from the physical location, such as a conference room, is picked up from the single microphone.

As an example, the active microphone may be selected manually or based on prioritized classes. For example, each device may be assigned a priority, based on its audio certification or ability, with a higher priority device likely providing a higher quality audio experience for the teleconference. As an example of prioritizing devices according to their audio certification or ability, the following example list of devices may be prioritized as follows: in-room installed speakerphone, attachable large form factor speakerphone, handheld speakerphone, notebook computer, and Bluetooth earpiece.

When it is determined that devices on a teleconference are physically colocated, the computing device 100 may configure the microphone from the physically colocated device that belongs to the higher priority class to remain active. As an example, if the physically colocated devices include a speakerphone and a Bluetooth earpiece, it is likely that a user may prefer to use the speakerphone and its audio, and not the Bluetooth earpiece, due to higher quality audio experience the speakerphone may provide. As a result, the computing device 100 may configure only the microphone of the speakerphone to remain active, according to it higher priority class.

Instructions to mute other microphones from the physically colocated devices 110 represent program instructions that when executed by the processor 102 cause the computing device 100 to continue the above instruction by ensuring that the microphone from only one of the physically colocated devices to remain active while the microphone of the other physically colocated devices are muted. This is particularly useful, for example, when one of the physically colocated devices is unmuted. The computing device 100 intelligently governs that only one microphone from the physically colocated devices can be active. As a result, when one of the physically colocated devices is unmuted, the computing device automatically mutes the earlier active device, in order to avoid any feedback or reverberation.

Memory device 104 represents generally any number of memory components capable of storing instructions that can be executed by processor 102. Memory device 104 is non-transitory in the sense that it does not encompass a transitory signal but instead is made up of at least one memory component configured to store the relevant instructions. As a result, the memory device 104 may be a non-transitory computer-readable storage medium. Memory device 104 may be implemented in a single device or distributed across devices. Likewise, processor 102 represents any number of processors capable of executing instructions stored by memory device 104. Processor 102 may be integrated in a single device or distributed across devices. Further, memory device 104 may be fully or partially integrated in the same device as processor 102, or it may be separate but accessible to that device and processor 102.

In one example, the program instructions 106-110 can be part of an installation package that when installed can be executed by processor 102 to implement the components of the computing device 100. In this case, memory device 104 may be a portable medium such as a CD, DVD, or flash drive or a memory maintained by a server from which the installation package can be downloaded and installed. In another example, the program instructions may be part of an application or applications already installed. Here, memory device 104 can include integrated memory such as a hard drive, solid state drive, or the like.

Figure 2:
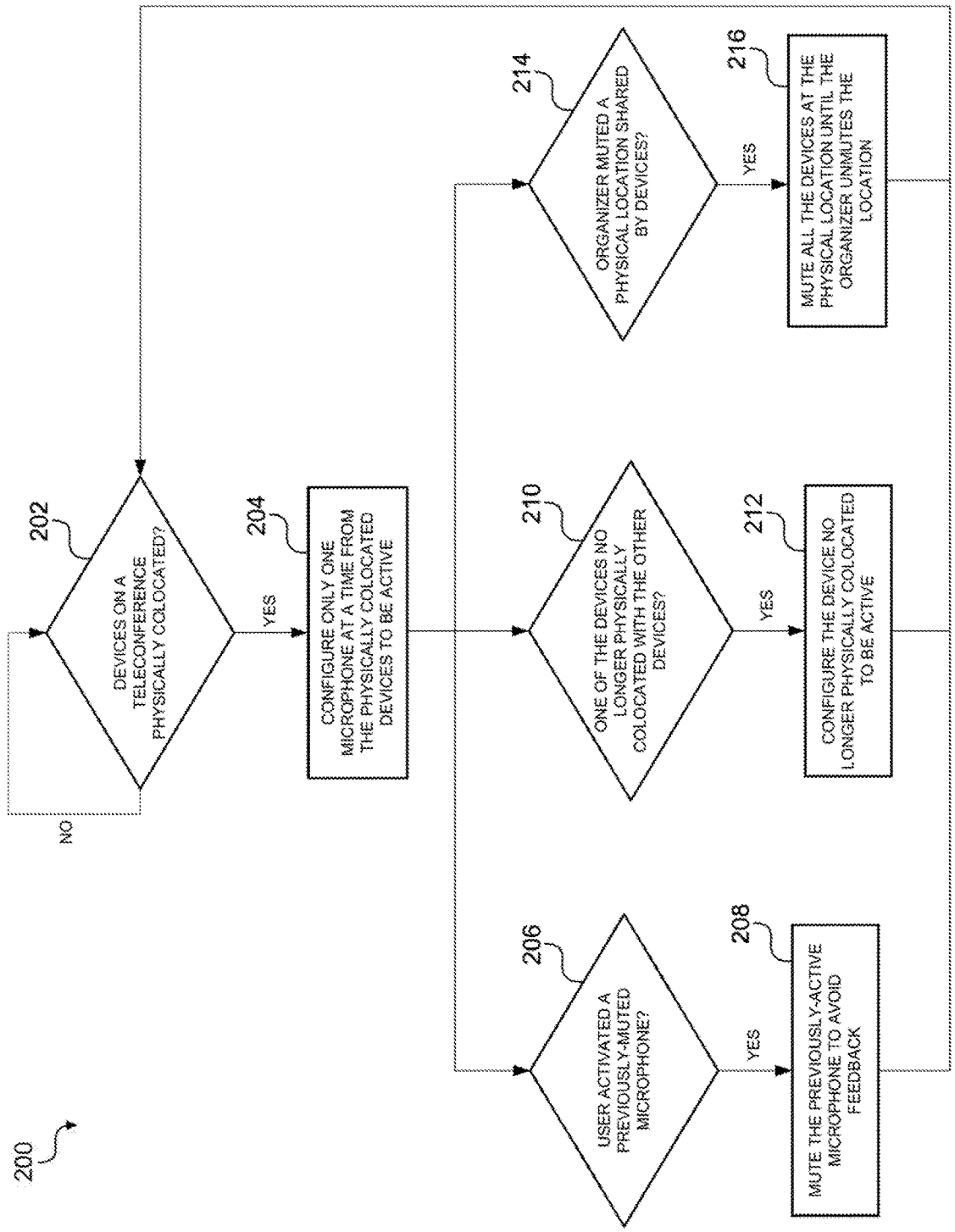
FIG. 2 illustrates a method of operation at a computing device for configuring one microphone at a time from physically colocated devices to remain active for participating in a teleconference, according to an example.

FIG. 2 illustrates a method 200 of operation at a computing device for configuring one microphone at a time from physically colocated devices to remain active for participating in a teleconference, according to an example. As an example, method 200 is described with reference to computing device 100. At 202, the computing device 100 determines whether devices on a teleconference are physically colocated with respect to each other. When multiple devices on the teleconference share the same physical colocation, there is the possibility of feedback and reverberation, for example, from microphones of the multiple devices being live and transmitting on the various devices while in close proximity to each other. As a result, the audio of the teleconference may be distorted and/or obscured. As described above, the determination of whether devices on the teleconference are physically colocated with respect to each other may be made based on audio sensing and/or geolocation, among other examples.

At 204, the computing device 100 configures only one microphone at a time from the physically colocated devices to be active, while the microphone from the other physically colocated devices may be muted. As described above, the microphone configured to be active may be selected based on a priority class that is likely to provide a better audio experience than the other physically colocated devices may be able to provide.

At 206, the computing device 100 determines whether a user activates a previously-muted microphone from the group of physically colocated devices. This scenario may occur, for example, when a user prefers to use a microphone from a physically colocated device that may belong to a lower priority class than the currently active microphone. At 208, if the user does activate the previously-muted microphone, the computing device 100 automatically mutes the now previously-active microphone, in order to avoid any feedback between the physically colocated devices.

At 210, the computing device 100 determines whether one of the devices on the teleconference is no longer physically colocated with the other devices. This may occur, for example, when a user leaves a conference room with his device, but desires to continue to be on the teleconference. At 212, the computing device 100 configures the device no longer physically colocated with the other devices to be active. As an example, if this device was muted when in the conference room with the other physically colocated devices, the computing device 100 may automatically unmute this device once no longer physically colocated with the other devices. As an example, if the device no longer physically colocated with the devices was the active device while in the conference room, the computing device 100 may configure the microphone of the physically colocated device belonging to the next higher priority class to be active.

At 214, the computing device 100 determines whether an organizer of the teleconference muted a physical location shared by devices. For example, if sensitive material is being discussed in the conference room, a mute room option may be available for the organizer to select, eliminating the risk of a microphone from one of the physically colocated devices in the conference room being unintentionally active while users in the conference room is discussing the sensitive material. At 216, the computing device 100 mutes all devices at the shared physical location (e.g., the conference room), until the organizer unmutes the location. Once the organizer unmutes the location, the computing device 100 returns to 202, by determining whether devices on the teleconference remain physically colocated, and configuring only one microphone at a time from the physically colocated devices to be active.

Figure 3:
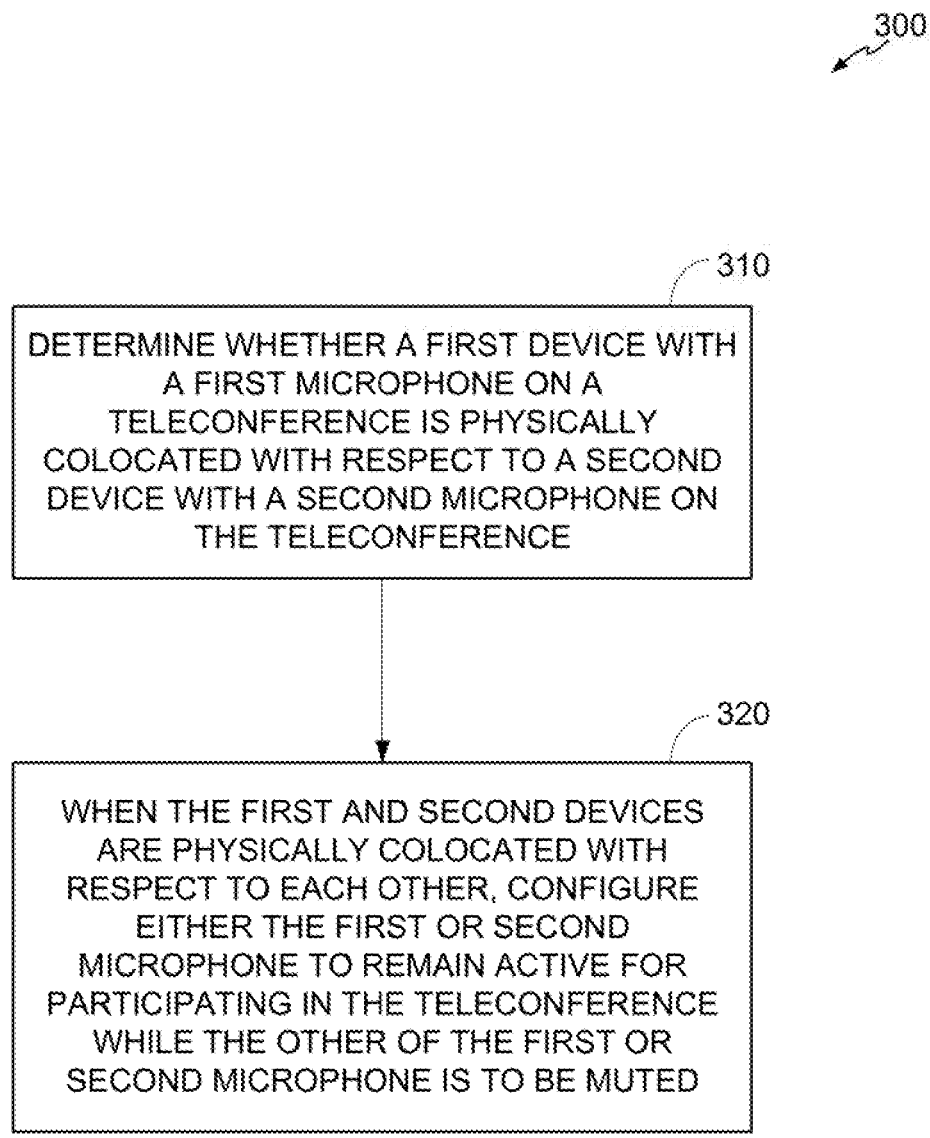
FIG. 3 is a flow diagram in accordance with an example of the present disclosure.

FIG. 3 is a flow diagram 300 of steps taken to implement a method for configuring one microphone at a time from physically colocated devices to remain active for participating in a teleconference, according to an example. In discussing FIG. 3, reference may be made to the example computing device 100 illustrated in FIG. 1. Such reference is made to provide contextual examples and not to limit the manner in which the method depicted by FIG. 3 may be implemented.

At 310, the computing device determines whether a first device with a first microphone on the teleconference is physically colocated with respect to a second device with a second microphone on the teleconference. As an example, the first and second devices on the teleconference are physically colocated with respect to each other when the first and second microphones are in proximity to each other for the first and second devices to be vulnerable to producing feedback. This may be determined based on the audio sensing, as described above. For example, the first device may use the collection of ambient noise in the environment around it to create a silence signature. Similarly, the second device may create its own silence signature as well. The computing device may then collect the audio sensed by the first and second devices, and determine whether they are physically colocated, based on the similarity of the silence signatures (e.g., physically colocated if substantially similar silence signatures). As described above, the determination of whether the first and second device are physically colocated may also be based on whether the first and second devices share a geolocation.

At 320, when the first and second devices are physically colocated with respect to each other, the computing device configures either the first or second microphone to remain active for participating in the teleconference while the other of the first or second microphone is to be muted. As an example, either of the first or second microphone to remain active is selected by the computing device based on a prioritization of the physically colocated devices to provide an improved audio experience for the teleconference. The prioritization of the physically colocated devices may be based on an audio certification or ability of each device from the physically colocated devices, as described above. As an example, either of the first or second microphone to remain active may also be manually selected by a user from the physically colocated devices.

Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:
1. A method comprising:
    determining whether a first device with a first microphone on a teleconference is physically colocated with respect to a second device with a second microphone on the teleconference by:

comparing ambient noise collected with the first microphone with ambient noise collected by the second microphone; and determining the first device and the second device are colocated based on the comparison; and in response to the first and second devices being physically colocated with respect to each other, selecting the first microphone to be active for participating in the teleconference while causing the second microphone to be muted.

2. The method of claim 1, wherein the first and second devices on the teleconference are physically colocated with respect to each other when the first and second microphones are in proximity to each other for the first and second devices to be vulnerable to producing feedback.

3. The method of claim 1, wherein the first and second devices on the teleconference are physically colocated with respect to each other when the first and second devices share a geolocation.

4. The method of claim 1, wherein the first microphone to be active is selected based on a prioritization of the physically colocated devices.

5. The method of claim 4, wherein the prioritization of the physically colocated devices is based on an audio certification or ability of each device from the physically colocated devices.

6. The method of claim 1, wherein the first microphone to be active is manually selected by a user from the physically colocated devices.

7. The method of claim 6, comprising muting a previously active microphone of a device from the physically colocated devices when the user is to manually activate a microphone of another device from the physically colocated devices.

8. The method of claim 1, comprising muting all microphones from the physically colocated devices when a location of the physically colocated devices is designated to be muted.

9. A non-transitory computer-readable storage medium comprising program instructions which, when executed by a processor, to cause the processor to:

determine a first device and a second device on a teleconference that are physically colocated with respect to each other by:

comparing ambient noise collected with a microphone of the first device with ambient noise collected by a microphone of the second device; and determining the first device and the second device are colocated based on the comparison;

select the microphone of the first device to be active for participating in the teleconference; and mute the microphone of the second device.

10. The non-transitory computer-readable storage medium of claim 9, wherein the first device and the second device are physically colocated with respect to each other when the microphones of the first and second devices are in proximity to each other for the first and second devices to be vulnerable to producing feedback.

11. The non-transitory computer-readable storage medium of claim 9, wherein the first and second devices on the teleconference are physically colocated with respect to each other when the first and second devices share a geolocation.

12. The non-transitory computer-readable storage medium of claim 9, wherein the microphone of the first device that is to be active is selected based on a prioritization of the physically colocated first and second devices.

13. The non-transitory computer-readable storage medium of claim 9, comprising muting microphones from the physically colocated first and second devices when a location of the physically colocated first and second devices are designated to be muted.

14. A computing device comprising a processor to:

determine whether a first device with a first microphone on a teleconference is physically colocated with respect to a second device with a second microphone on the teleconference by:

comparing ambient noise collected with the first microphone with ambient noise collected by the second microphone; and determining the first and the second device are colocated based on the comparison;

wherein the first and second devices on the teleconference are physically colocated with respect to each other when the first and second microphones are in proximity to each other for the first and second devices to be vulnerable to producing feedback; and in response to the first and second devices are physically colocated with respect to each other, select the first microphone to be active for participating in the teleconference and cause the second microphone to be muted.

15. The computing device of claim 14, wherein first microphone to be active is selected based on a prioritization of the physically colocated devices.

* * * * *